(12) United States Patent
Brehm et al.

(10) Patent No.: US 7,866,452 B2
(45) Date of Patent: Jan. 11, 2011

(54) VIBRATION DAMPER FOR VEHICLES

(75) Inventors: Stefan Brehm, Hennef (DE); Manfred Heinisch, Eitorf (DE); Michael Müller, Hennef (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/861,053

(22) Filed: Jun. 4, 2004

(65) Prior Publication Data
US 2005/0016805 A1    Jan. 27, 2005

(30) Foreign Application Priority Data
Jun. 6, 2003    (DE) .................... 103 25 730

(51) Int. Cl.
  *F16F 9/48* (2006.01)
(52) U.S. Cl. ............. 188/284; 188/322.22; 188/322.19
(58) Field of Classification Search ................ 188/284, 188/322.18, 322.19, 322.22, 300; 267/70, 267/141.1, 141; 16/86 R, 86 A
See application file for complete search history.

(56) References Cited

U.S. PATENT DOCUMENTS

| | | | |
|---|---|---|---|
| 2,782,765 A * | 2/1957 | Robinson | 92/12 |
| 2,984,529 A * | 5/1961 | Dailey | 277/438 |
| 3,465,650 A * | 9/1969 | Gluck | 92/85 R |
| 4,345,748 A * | 8/1982 | Wossner et al. | 267/226 |
| 4,483,044 A * | 11/1984 | Johnston et al. | 16/70 |
| 4,527,674 A * | 7/1985 | Mourray | 188/284 |
| 5,570,763 A * | 11/1996 | Parejo | 188/282.8 |
| 5,667,041 A * | 9/1997 | Jensen | 188/284 |
| 5,810,130 A * | 9/1998 | Mc Candless | 188/322.22 |
| 5,984,060 A * | 11/1999 | Clark et al. | 188/322.16 |
| 6,691,840 B1 * | 2/2004 | Lisenker et al. | 188/267.1 |

FOREIGN PATENT DOCUMENTS

| | | |
|---|---|---|
| DE | 1 145 445 | 8/1960 |
| DE | 1 816 598 | 8/1960 |
| DE | 8 520 989 | 7/1985 |
| DE | 35 00 101 | 7/1986 |
| DE | 36 43 056 | 6/1988 |
| DE | 40 36 522 | 10/1991 |
| EP | 0 119 197 B1 | 11/1988 |
| EP | 0 120 005 B1 | 2/1989 |
| EP | 0 458 467 | 11/1991 |
| FR | 1.584.110 | 12/1969 |
| JP | 8-109943 * | 4/1996 |
| JP | 2002-39252 * | 2/2002 |

* cited by examiner

*Primary Examiner*—Bradley T King
(74) *Attorney, Agent, or Firm*—Cohen Pontani Lieberman & Pavane LLP

(57) ABSTRACT

A vibration damper for vehicles comprises a work cylinder in which a piston is guided axially by a piston rod. The piston divides the work cylinder into two work spaces filled with damping fluid. A tension stop is provided between the piston and a piston rod guide, wherein a tension stop element including a flexible part and a reinforcing ring is arranged between a support fastened to the piston rod and the piston rod guide. The reinforcing ring limits the deformation of the flexible part of tension stop when subjected to force during operation so that permissible shearing stresses of the flexible part are not exceeded.

8 Claims, 3 Drawing Sheets

A - A

VIBRATION DAMPER FOR VEHICLES

BACKGROUND OF THE INVENTION

Priority Claim

This application claims priority under 35 U.S.C. §119 to German Application DE 103 25 730.6 filed Jun. 6, 2003.

Field of the Invention

The invention is directed to a vibration damper for vehicles comprising a work cylinder in which a piston is guided axially by a piston rod. The piston divides the work cylinder into two work spaces filled with damping fluid. A pull stop or tension stop is provided between the piston and a piston rod guide.

BACKGROUND OF THE INVENTION

Vibration dampers in which a support ring is arranged at the piston rod and serves as a contact surface for a flexible stop ring are already known (DE-GM 85 20 989). This stop ring contacts an inner end face of the piston rod guide after a determined travel distance of the piston rod at the cylinder so that a tension stop is formed. It is disadvantageous that the flexible stop ring is deformed not only in axial direction but also in radial direction when acted upon axially by pressure. Accordingly, the flexible stop ring may be deformed beyond permissible shearing strains and be destroyed.

Further, other tension stop devices are known (EP 119 197 B1, EP 120.005 B1) in which a flexible ring is likewise used as a tension stop and is arranged at the piston rod by means of angled holders in such a way that axial deformation as well as radial deformation of the flexible ring takes place when acted upon axially by pressure.

SUMMARY OF THE INVENTION

On this basis, the invention may provide a simple and economical tension stop in a vibration damper for vehicles, which tension stop has a sufficient durability in spite of reoccurring loading.

This may be accomplished, according to the invention, in that a chambered tension stop element is arranged between a support fastened to the piston rod and the piston rod guide.

In this connection, it is advantageous that axial forces can be contained or intercepted by means of a corresponding chambering of the tension stop element without the occurrence of a radial deflection of the tension stop element.

According to a substantial feature, the tension stop element comprises a flexible element which is enclosed by a reinforcing part. It is advantageous that the height of the reinforcing part defines the blocking length of the flexible element. Accordingly, deformation can be limited even as loading increases, so that the permissible shearing stresses are not exceeded.

Further, the flexible part and the reinforcing part are fixedly connected to one another. The flexible part is advantageously connected to the reinforcing part by vulcanization. In an advantageous manner in this regard, it is possible to select rubber mixtures in such a way that the stop noises are minimized.

In another embodiment form, the tension stop element is guided on the piston rod and arranged so as to be moveable axially.

In another embodiment form, the tension stop element is provided with at least one protuberance on at least one front side. The arrangement of the corresponding protuberances has a positive influence on stop noises and on the blocking length of the tension stop.

According to another construction, a plurality of protuberances are arranged so as to be distributed along the circumference of the front side.

According to another feature, the end area of the spring is provided with a supporting element for supporting at the tension stop element.

For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
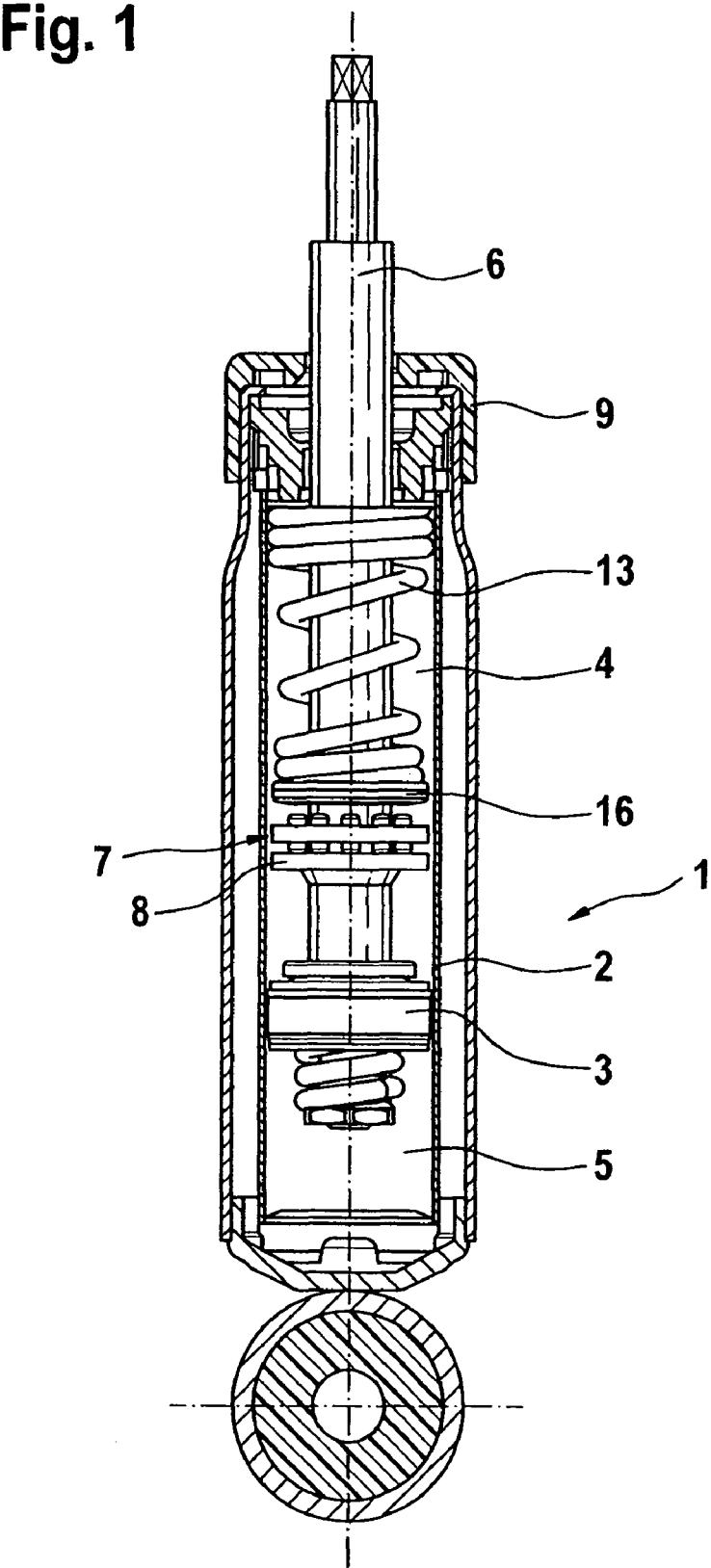
FIG. 1 shows a vibration damper in section.

The vibration damper 1 shown in FIG. 1 substantially comprises the work cylinder 2 and the piston 3 which is guided at the piston rod 6 so as to be moveable axially. The piston 3 divides the work cylinder 2 into the upper work space 4 and the lower work space 5. Damping valves (not shown) are generally provided in the damping piston 3 for the respective flow direction.

The piston rod 6 is guided out through a piston rod guide 9 located where the piston rod 6 is introduced to the work cylinder 2. A tension stop element 7 is provided between the piston rod guide 9 and the piston 3. The tension stop element 7 is supported on the side facing the piston 3 by the support 8 and is guided in direction of the piston rod guide 9 so as to be axially movable at least partially on the piston rod 6.

Further, the spring 13 and the supporting element 16 are constructed in operative connection with the tension stop element 7.

Figure 2:
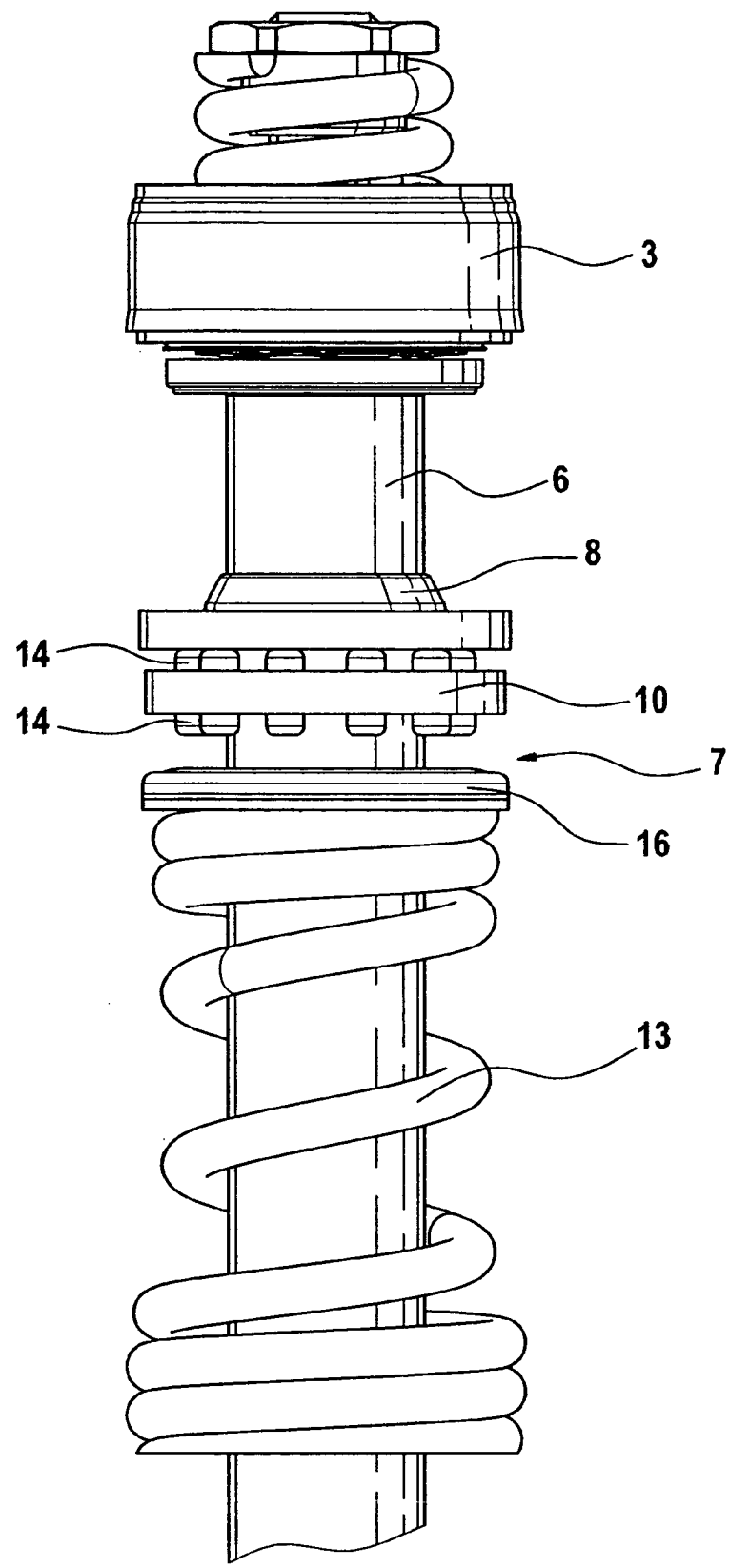
FIG. 2 shows a detailed view of a tension stop element.

A piston rod 6 with the piston 3 fastened thereto is shown in detail in FIG. 2. The tension stop element 7 is arranged between the support 8 and the supporting element 16 of the spring 13. In this embodiment example, the tension stop element 10 is provided with protuberances 14 on both sides of the respective front side 15. These protuberances 14 belong to the flexible element 11 which is shown in detail in FIGS. 3 and 4.

Figure 3:
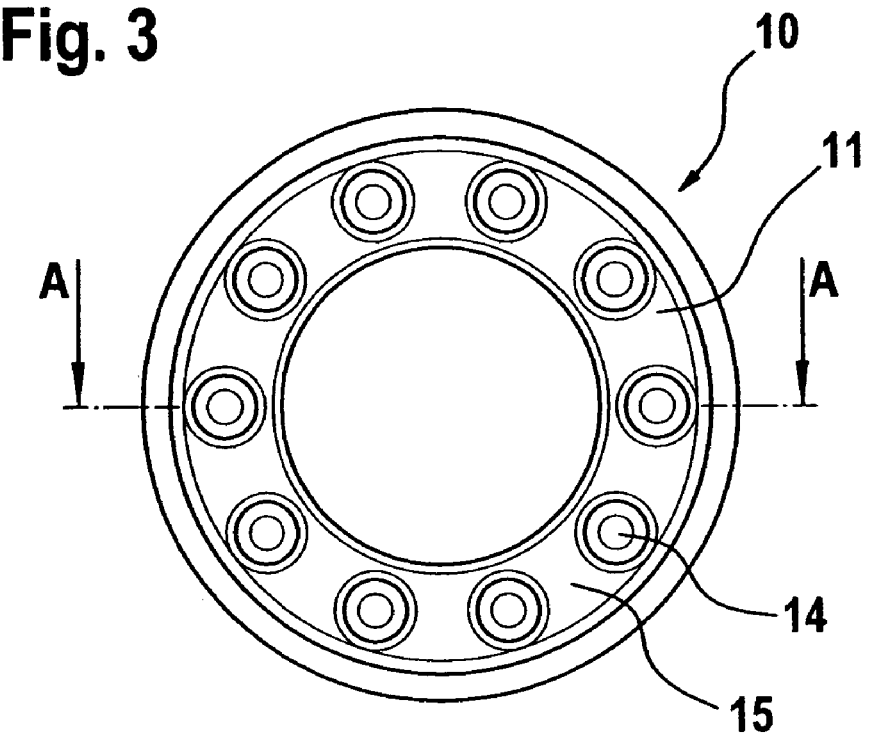
FIGS. 3 and 4 show a flexible element together with the reinforcing part in a top view and in section.
Figure 4:
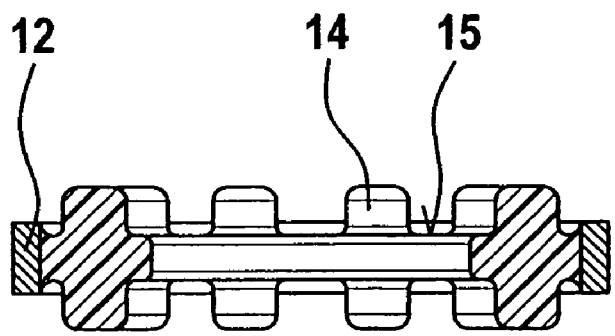

FIGS. 3 and 4 show the tension stop element 10 in detail. The reinforcing part 12 delimits the flexible element 11 on the radial outer side. The flexible element 11 and the reinforcing part 12 are constructed in one piece, and they can be connected to one another by vulcanizing. On the respective front side 15 of the flexible element 11, protuberances 14 are arranged so as to be distributed along the circumference and serve for support relative to the support 8 and the supporting element 16 of the vibration damper 1.

To summarize the reference numerals shown: 1 is a vibration damper. 2 is a work cylinder. 3 is a piston. 4 is a upper work space. 5 is a lower work space. 6 is a piston rod. 7 is a tension stop element. 8 is a support. 9 is a piston rod guide. 10 is a tension stop element. 11 is a flexible element. 12 is a reinforcing part. 13 is a spring. 14 is a protuberance. 15 is a front side. 16 is a supporting element.

The invention is not limited by the embodiments described above which are presented as examples only but can be modified in various ways within the scope of protection defined by the appended patent claims.

What is claimed is:

1. A vibration damper for vehicles comprising:
   a piston;
   a piston rod connected to the piston;
   a work cylinder in which the piston is guided axially by the piston rod wherein the piston divides the work cylinder into two work spaces filled with damping fluid, the piston configured to conduct flow therethrough and to provide damping in both inward and outward movements of the piston in the work cylinder;
   a piston rod guide located where the piston rod is introduced to the work cylinder;
   a tension stop element located between the piston and the piston rod guide, the tension stop element being axially movable relative to the piston on the piston rod, and the tension stop element comprising
      a ring-shaped reinforcing part having two axial ends and
      a flexible element radially enclosed by and fixedly connected to said reinforcing part, said flexible element having at least one protuberance on one axial side of said tension stop element such that said protuberance is part of said flexible element, the protuberance being deformable in response to an axial force on the tension stop element, an axial length of said reinforcing part limiting the deformation of the flexible element so that a permissible shearing stress of the flexible element is not exceeded; and
   a support fastened to the piston rod and located between the piston and the tension stop element,
   wherein the at least one protuberance extends in an axial direction towards the support fastened to the piston rod, the at least one protuberance configured to contact the support fastened to the piston rod in an extended position of the piston rod.

2. A vibration damper according to claim 1, wherein the flexible element is connected to the reinforcing part by vulcanization.

3. A vibration damper according to claim 1, wherein a spring is arranged between the tension stop element and the piston rod guide.

4. A vibration damper according to claim 1, wherein the tension stop element is guided on the piston rod and arranged so as to be moveable axially.

5. A vibration damper according to claim 1, wherein a plurality of protuberances are arranged so as to be distributed along the circumference of said axial side of the flexible element.

6. A vibration damper according to claim 1, wherein said tension stop elements comprises at least one further protuberance on the other axial side of said tension stop element, each of said at least one protuberance and said at least one further protuberance projecting past a respective one of the axial ends of the reinforcing part and being deformable in response to an axial force on the tension stop element.

7. A vibration damper according to claim 1, wherein the tension stop element is arranged on said piston rod so that it is axially movable relative to the piston and the piston rod guide.

8. A vibration damper for vehicles comprising:
   a piston;
   a piston rod connected to the piston;
   a work cylinder in which the piston is guided axially by the piston rod wherein the piston divides the work cylinder into two work spaces filled with damping fluid, the piston configured to conduct flow therethrough and to provide damping in both inward and outward movements of the piston in the work cylinder;
   a piston rod guide located where the piston rod is introduced to the work cylinder;
   a tension stop element located between the piston and the piston rod guide, the tension stop element being axially movable relative to the piston on the piston rod, and the tension stop element comprising
      a ring-shaped reinforcing part having two axial ends and
      a flexible element radially enclosed by and fixedly connected to said reinforcing part, said flexible element having at least one protuberance on one axial side of said tension stop element such that said protuberance is part of said flexible element, the protuberance being deformable in response to an axial force on the tension stop element, an axial length of said reinforcing part limiting the deformation of the flexible element so that a permissible shearing stress of the flexible element is not exceeded;
   a support fastened to the piston rod and located between the piston and the tension stop element; and
   a spring is arranged between the tension stop element and the piston rod guide, an end area of the spring is provided with a supporting element for supporting the spring at the tension stop element,
   wherein the tension stop elements comprises at least one further protuberance on the other axial side of said tension stop element, each of said at least one protuberance and said at least one further protuberance projecting past a respective one of the axial ends of the reinforcing part and being deformable in response to an axial force on the tension stop element,
   the at least one protuberance extends in an axial direction towards the support, the at least one protuberance configured to contact the support fastened to the piston rod in an extended position of the piston rod, and
   the at least one further protuberance extends in an axial direction towards the supporting element for supporting the spring, the at least one protuberance configured to contact the supporting element for supporting the spring in an extended position of the piston rod.

* * * * *